US012739782B2

(12) United States Patent
Li

(10) Patent No.: US 12,739,782 B2
(45) Date of Patent: Sep. 15, 2026

(54) USAGE INDICATION METHOD AND APPARATUS, USAGE DETERMINATION METHOD AND APPARATUS, COMMUNICATION APPARATUS, AND STORAGE MEDIUM

(71) Applicant: Beijing Xiaomi Mobile Software Co., Ltd., Beijing (CN)

(72) Inventor: Xiaolong Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 315 days.

(21) Appl. No.: 18/580,904

(22) PCT Filed: Jul. 21, 2021

(86) PCT No.: PCT/CN2021/107700

§ 371 (c)(1),
(2) Date: Jan. 19, 2024

(87) PCT Pub. No.: WO2023/000226

PCT Pub. Date: Jan. 26, 2023

(65) Prior Publication Data

US 2024/0340840 A1 Oct. 10, 2024

(51) Int. Cl.
*H04W 64/00* (2009.01)
*H04L 5/00* (2006.01)
*H04W 4/12* (2009.01)

(52) U.S. Cl.
CPC .......... *H04W 64/00* (2013.01); *H04L 5/0051* (2013.01); *H04W 4/12* (2013.01)

(58) Field of Classification Search
CPC ........ H04W 64/00; H04W 4/12; H04L 5/0051
USPC ........................................................ 455/456.1
See application file for complete search history.

(56) References Cited

U.S. PATENT DOCUMENTS

| | | | | |
|---|---|---|---|---|
| 2018/0213350 | A1* | 7/2018 | Pon | H04W 4/02 |
| 2019/0353748 | A1* | 11/2019 | Rydén | G01S 5/14 |
| 2022/0173857 | A1* | 6/2022 | Michalopoulos | H04B 17/327 |
| 2022/0231816 | A1* | 7/2022 | Si | H04L 5/0053 |
| 2024/0187903 | A1* | 6/2024 | Hasegawa | H04B 17/328 |
| 2024/0192304 | A1* | 6/2024 | Rao | G01S 5/0268 |

FOREIGN PATENT DOCUMENTS

| | | | |
|---|---|---|---|
| CN | 110881203 | A | 3/2020 |
| CN | 111108718 | A | 5/2020 |
| CN | 111869156 | A | 10/2020 |
| CN | 112438064 | A | 3/2021 |

(Continued)

OTHER PUBLICATIONS

QUALCOMM Inc. "Summary on agenda item 8.11.4 on on-demand PRS", 3GPP TSG-RAN WG2 Meeting #114-e R2-2106467, May 27, 2021.

(Continued)

*Primary Examiner* — Don N Vo
(74) *Attorney, Agent, or Firm* — Volpe Koenig

(57) ABSTRACT

A method, apparatus and computer readable medium for improving utilization of a wireless network. The utilization of the wireless network is improved by: transmitting a set of positioning reference signal (PRS) configurations to a terminal; and indicating a usage of the set of PRS configurations to the terminal.

18 Claims, 5 Drawing Sheets

(56) References Cited

FOREIGN PATENT DOCUMENTS

| | | | |
|---|---|---|---|
| WO | 2020166971 | A1 | 8/2020 |
| WO | 2021064239 | A1 | 4/2021 |

OTHER PUBLICATIONS

Interdigital Inc. "Discussion on On-demand reference signals for positioning", 3GPP RAN WG2 Meeting #113-e R2-2100375, Feb. 5, 2021.

Xiaomi. "Discussion on PRS enhancements", 3GPP TSG RAN WG2 #112 R2-2009574, Nov. 13, 2020.

CATT, "Further discussion on on-demand PRS", 3GPP TSG-RAN WG2 Meeting #114-e, R2-2104803, Electronic meeting, May 19-27, 2021.

Qualcomm Incorporated, "On-Demand DL-PRS", 3GPP TSG-RAN WG2 Meeting #114-e, R2-2106084, Electronic, May 19-27, 2021.

Intel Corporation, "Support of on demand PRS", 3GPP TSG-RAN WG2 Meeting # 114, electrontic, R2-2104924, Online, May 19-27, 2021.

* cited by examiner 900
922
processing component
wireless transmitting/ receiving component
924
antenna component
926

USAGE INDICATION METHOD AND APPARATUS, USAGE DETERMINATION METHOD AND APPARATUS, COMMUNICATION APPARATUS, AND STORAGE MEDIUM

CROSS-REFERENCE TO RELATED APPLICATION

The present application is a U.S. National Stage of International Application No. PCT/CN2021/107700, filed on Jul. 21, 2021, the contents of all of which are incorporated herein by reference in their entirety for all purposes.

BACKGROUND

5G New Radio (NR) introduces a plurality of positioning technologies to enable positioning of a User Equipment (UE). Some of these positioning technologies require the network to provide the UE with positioning assistance information, such as positioning reference signal (PRS) configurations.

SUMMARY

The present disclosure relates to the technical field of communications, in particular to a usage indication method, a usage determination method, a usage indication apparatus, a usage determination apparatus, a communication apparatus, and a computer-readable storage medium.

According to a first aspect of the examples of the present disclosure, there is provided a usage indication method, performed by a network device and includes: transmitting a set of positioning reference signal (PRS) configurations to a terminal; and indicating a usage of the set of PRS configurations to the terminal.

According to a second aspect of the examples of the present disclosure, there is provided a usage determination method, performed by a terminal and includes: receiving a set of positioning reference signal (PRS) configurations transmitted by a network device; and determining a usage of the set of PRS configurations according to an indication of the network device.

According to a third aspect of the examples of the present disclosure, there is provided a usage indication apparatus, which includes one or more processors, the processors being configured to transmit a set of positioning reference signal (PRS) configurations to a terminal; and to indicate a usage of the set of PRS configurations to the terminal.

According to a fourth aspect of the examples of the present disclosure, there is provided a usage determination apparatus, which includes one or more processors, the processors being configured to receive a set of positioning reference signal (PRS) configurations transmitted by a network device; and to determine a usage of the set of PRS configurations according to an indication of the network device.

According to a fifth aspect of the examples of the present disclosure, there is provided a communication apparatus, including: a processor; and a memory storing a computer program which, when executed by the processor, causes the processor to implement the usage indication method described above.

According to a sixth aspect of the examples of the present disclosure, there is provided a communication apparatus, including: a processor; and a memory storing a computer program which, when executed by the processor, causes the processor to implement the usage determination method described above.

According to a seventh aspect of the examples of the present disclosure, there is provided a non-transitory computer-readable storage medium, storing a computer program which, when executed by a processor, causes the processor to implement steps in the usage indication method described above.

According to an eighth aspect of the examples of the present disclosure, there is provided a non-transitory computer-readable storage medium, storing a computer program which, when executed by a processor, causes the processor to implement steps in the usage determination method described above.

BRIEF DESCRIPTION OF THE DRAWINGS

In order to illustrate the technical solutions in the examples of the present disclosure more clearly, the accompanying drawings to be used in the description of the examples will be briefly introduced below. Notably, the accompanying drawings in the following description are merely some of the examples of the present disclosure, and for those of ordinary skill in the art, other accompanying drawings can be obtained according to these accompanying drawings without creative effects.

DETAILED DESCRIPTION

Figures 1, 2, 3:
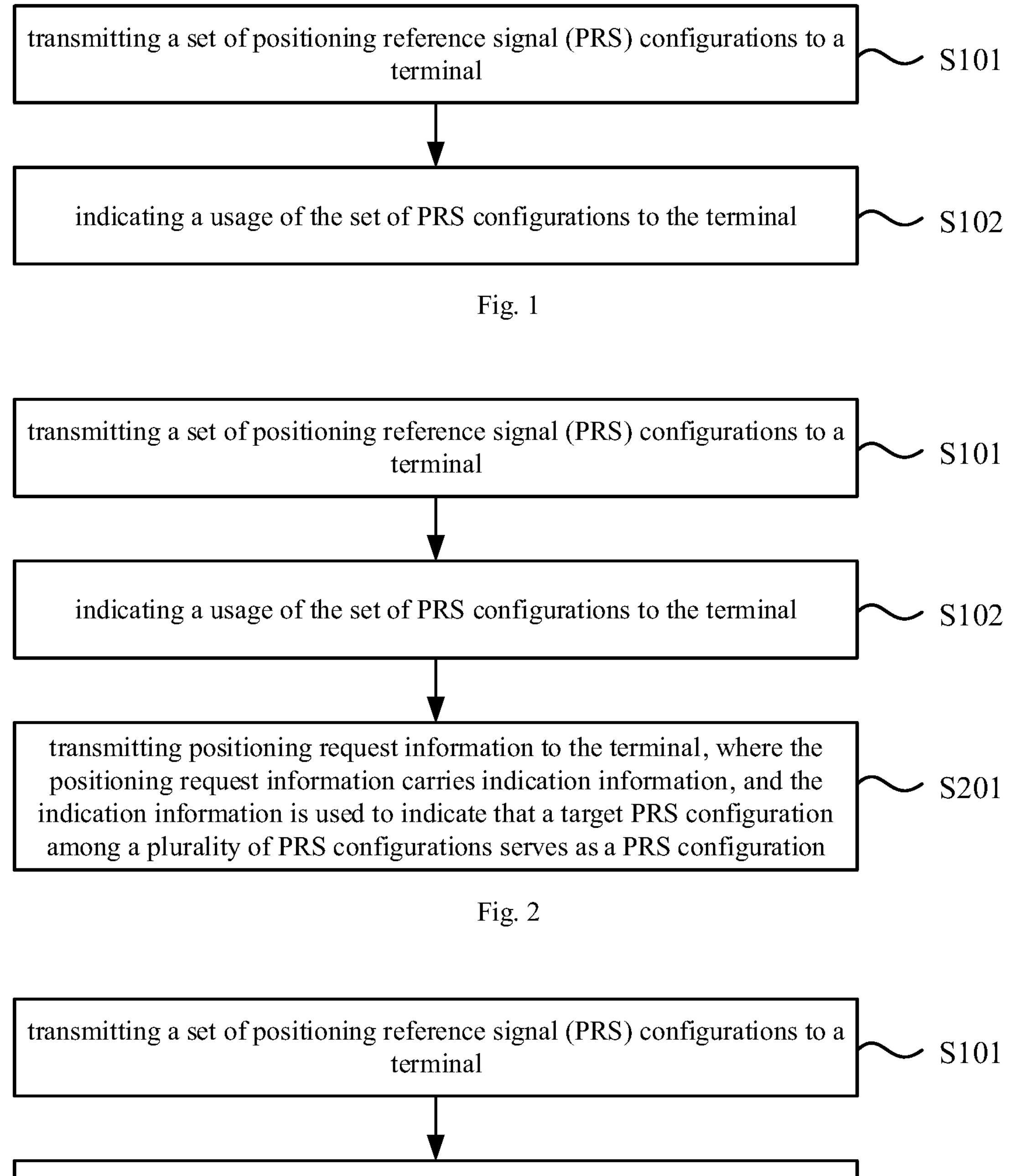
FIG. 1 is a schematic flowchart of a usage indication method according to an example of the present disclosure.
FIG. 2 is a schematic flowchart of another usage indication method according to an example of the present disclosure.
FIG. 3 is a schematic flowchart of yet another usage indication method according to an example of the present disclosure.

The technical solutions in the examples of the present disclosure will be described clearly and completely below in conjunction with the accompanying drawings in the examples of the present disclosure. Notably, the described examples are a part of the examples of the present disclosure, rather than all of the examples. Based on the examples of the present disclosure, all other examples obtained by those of ordinary skill in the art without creative effects fall within the scope of protection of the present disclosure.

Terms used in the examples of the present disclosure are for the purpose of describing particular examples and are not intended to limit the examples of the present disclosure. The singular forms "a" and "the" used in the examples of the present disclosure and in the appended claims are also intended to include the plural forms, unless the context clearly indicates otherwise. It is also to be understood that the term "and/or" as used refers to and includes any or all possible combinations of one or more associated listed items.

It is to be understood that although the terms first, second, third, etc., may be used to describe various types of information in the examples of the present disclosure, such information is not limited to these terms. These terms are used to distinguish the same type of information from one another. For example, without departing from the scope of the examples of the present disclosure, first information may also be referred to as second information, and similarly, second information may also be referred to as first information. Depending on the context, the word "if" as used may be interpreted as "when," "as," or "in response to determining."

For the purposes of brevity and ease of understanding, the terms "greater than," "less than," "higher than," or "lower than" are used to characterize size relationships. But for those skilled in the art, it can be understood that the term "greater than" also covers the meaning of "greater than or equal to," and the term "less than" also covers the meaning of "less than or equal to," the term "higher than" covers the meaning of "higher than or equal to," and the term "lower than" also covers the meaning of "lower than or equal to."

Transmitting the positioning assistance information to the UE in the positioning process will lead to an increase in time delay. In order to reduce the time delay, a manner of pre-configuring the positioning assistance information for the UE is used in related art, that is, a network device configures the positioning assistance information for the UE prior to positioning the UE.

In addition, the network device can also configure PRS configurations requested on-demand for the UE. The PRS configurations requested on-demand may be, for example, a set including a plurality of PRS configurations. The UE selects a PRS configuration from the set and transmits a request to the network device to request for the configuration.

In a case that the network device is suitable for both pre-configuring positioning assistance information for the UE and configuring the PRS configuration requested on-demand for the UE, the signaling needs to carry both the preconfigured positioning assistance information and the PRS configuration requested on-demand. The positioning assistance information and the PRS configuration requested on-demand generally need to occupy more bits, resulting in a high signaling overhead.

FIG. 1 is a schematic flowchart of a usage indication method according to an example of the present disclosure. The usage indication method illustrated in this example may be performed by a network device. The network device includes but is not limited to a base station and a core network. The network device can communicate with a terminal as a user equipment. The terminal includes but is not limited to a mobile phone, a tablet computer, a wearable device, a sensor, an Internet of Things device and other communication apparatuses.

As shown in FIG. 1, the usage indication method may include steps S101 and S102.

In step S101, transmitting a set of positioning reference signal (PRS) configurations to a terminal; and In step S102, indicating a usage of the set of PRS configurations to the terminal.

In an example, the network device can pre-configure positioning assistance information for the terminal, and can also configure a PRS configuration requested by the terminal on-demand. The positioning assistance information may include a PRS configuration. The terminal may receive a PRS according to the PRS configuration, and then perform positioning process according to the received PRS.

In this case, if the network device carries and transmits a PRS configuration as a preconfigured PRS configuration to the terminal and carries and transmits a set of PRS configurations as a PRS configuration requested on-demand to the terminal by means of the signaling, more signaling resources will be occupied, resulting in a high signaling overhead. For example, two Information Elements (IE) need to be provided in the signaling, one IE carries the PRS configuration as the preconfigured PRS configuration and the other IE carries the set of PRS configurations as the PRS configuration requested on-demand.

According to the example of the present disclosure, the network device transmits the set of PRS configurations to the terminal by means of a piece of signaling and indicates the usage of the set of PRS configurations to the terminal, without carrying, by means of the signaling, both a preconfigured PRS configuration and a PRS configuration requested on-demand, which is beneficial to saving signaling resources.

In an example, the network device may indicate the usage of the set of PRS configurations to the terminal in at least one of an explicit manner or an implicit manner.

In an explicit manner, for example, the network device can transmit a usage indication to the terminal to indicate the usage of the set of PRS configurations. There are three usages of the set of PRS configurations, that is, a PRS configuration in the set of PRS configurations serves as a PRS configuration requested by the terminal on-demand; alternatively, a PRS configuration in the set of PRS configurations serves as a PRS configuration preconfigured for the terminal; alternatively, a PRS configuration in the set of PRS configurations serves as both a PRS configuration requested by the terminal on-demand and a PRS configuration preconfigured for the terminal.

Since there are the above three usages of the set of PRS configurations, the usage indication may be set to occupy 2 bits, so as to realize the indication of the above three usages.

However, in a case that a PRS configuration in the set of PRS configurations is separately indicated, by means of a piece of signaling, to serve as a PRS configuration requested by the terminal on-demand, this signaling needs to indicate the whole set of PRS configurations, and the resources to be occupied are more than 2 bits.

Moreover, in a case that a PRS configuration in the set of PRS configurations is separately indicated, by means of a piece of signaling, to serve as a PRS configuration preconfigured for the terminal, this signaling needs to be able to indicate at least each PRS configuration in the set of PRS configurations, and the occupied resources are also more than 2 bits.

As a result, in the case that the usage of the set of PRS configurations is indicated in an explicit manner, compared with both carrying and transmitting a set of PRS configurations as a preconfigured PRS configuration to the terminal and carrying and transmitting a set of PRS configurations as a PRS configuration requested on-demand to the terminal by means of the signaling, relatively few resources are occupied, which is beneficial to saving signaling resources.

In an implicit manner, for example, after the network device transmits the set of PRS configurations to the terminal, in a case that the usage indication is not transmitted, the set of PRS configurations serves as a PRS configuration requested by the terminal on-demand by default, and in a case that the usage indication is transmitted, the network device indicates to the terminal by default that one or more PRS configurations in the set of PRS configurations serve as PRS configurations preconfigured for the terminal. Regardless of whether the usage indication is transmitted or not, compared with both carrying and transmitting a set of PRS configurations as a preconfigured PRS configuration to the terminal and carrying and transmitting a set of PRS configurations as a PRS configuration requested on-demand to the terminal by means of signaling, relatively few resources are occupied, which is beneficial to saving signaling resources.

It is to be noted that in a manner of implicit indication, in a case that the usage indication is not transmitted, a PRS configuration in the set of PRS configurations also serves as a PRS configuration preconfigured for the terminal by default. The usage indication being not transmitted specifically indicating which type of usages by default may be agreed in a communication protocol between the base station and the terminal.

In an example, indicating the usage of the set of PRS configurations to the terminal includes one of:

- indicating to the terminal that a PRS configuration in the set of PRS configurations serves as a PRS configuration requested by the terminal on-demand and a PRS configuration in the set of PRS configurations serves as a PRS configuration preconfigured for the terminal;
- indicating to the terminal that a PRS configuration in the set of PRS configurations serves as a PRS configuration requested by the terminal on-demand; or
- indicating to the terminal that a PRS configuration in the set of PRS configurations serves as a PRS configuration preconfigured for the terminal.

That is, the network device indicates the usage of the set of PRS configurations, which can indicate one of the above three usages.

It is to be noted that the indication of the usage of the set of PRS configurations may be directed to the whole set of PRS configurations, that is, indicating the usage of all PRS configurations in the set of PRS configurations; or be directed to a part of PRS configurations in the set of PRS configurations, that is, indicating the usage of one or more PRS configurations in the set of PRS configurations.

The network device can indicate that a PRS configuration in the set of PRS configurations merely serves as a PRS configuration requested by the terminal on-demand. In this case, the terminal can select a PRS configuration that needs to be requested in the set of PRS configurations, and generate an on-demand PRS configuration request and transmit the request to the network device to request for the selected PRS configuration. After receiving the request from the terminal, the network device can transmit to the terminal the PRS configuration requested by the terminal, for example, indicate to the terminal that the selected PRS configuration is allowed to be used, for another example, transmit to the terminal an identifier corresponding to the PRS configuration selected by the terminal, and for yet another example, transmit to the terminal the PRS configuration selected by the terminal.

The network device can indicate that a PRS configuration in the set of PRS configurations merely serves as a PRS configuration preconfigured for the terminal. In this case, the terminal can directly use the preconfigured PRS configuration to receive a downlink PRS in the positioning process. Further, the terminal cannot transmit an on-demand PRS configuration request to the network device. Alternatively, the terminal can transmit an on-demand PRS configuration request to the network device, however, the PRS configuration requested by the on-demand PRS configuration request does not include the PRS configuration and/or the PRS configuration identifier in the set of PRS configurations, so as to prevent the network device from not supporting the requested PRS configuration and/or not identifying the PRS configuration identifier requested by the terminal.

The network device can indicate that a PRS configuration in the set of PRS configurations serves as a PRS configuration requested by the terminal on-demand, and indicate that a PRS configuration in the set of PRS configurations also serves as a PRS configuration preconfigured for the terminal. In this case, on the one hand, the terminal can take one or more PRS configurations in the set of PRS configurations as preconfigured PRS configurations according to an indication of the network device, and on the other hand, the terminal can also transmit an on-demand PRS configuration request to the network device according to the set of PRS configurations, for example, select a PRS configuration in the set of PRS configurations and transmit the on-demand PRS configuration request to the network device to request for the selected PRS configuration. For example, in the case that the preconfigured PRS configuration does not meet the requirements of the terminal, the terminal can select a PRS configuration that meets the requirements of the terminal from the PRS configurations other than the preconfigured PRS configuration in the set of PRS configurations, and transmit the on-demand PRS configuration request to the network device to request for the selected PRS configuration.

In addition, in the case of indicating that a plurality of PRS configurations in the set of PRS configurations serve as preconfigured PRS configurations and a PRS configuration in the set of PRS configurations serve as a PRS configuration requested on-demand, the network device can indicate, when transmitting a positioning request information to the terminal in the subsequent positioning process, that one PRS configuration among the plurality of PRS configurations serves as the PRS configuration for use by the terminal by means of the positioning request information. In this case, the terminal can determine whether the PRS configuration indicated by the positioning request information meets the requirements (for example, positioning requirements), and if not, the terminal can select a PRS configuration that meets the requirements of the terminal from the PRS configurations other than the PRS configuration indicated by the positioning request information in the set of PRS configurations, and transmit an on-demand PRS configuration request to the network device to request for the selected PRS configuration.

In an example, indicating to the terminal that the PRS configuration in the set of PRS configurations serves as the PRS configuration preconfigured for the terminal includes:

- indicating to the terminal that a plurality of PRS configurations in the set of PRS configurations serve as PRS configurations preconfigured for the terminal;
- alternatively, indicating to the terminal that a PRS configuration in the set of PRS configurations serves as a PRS configuration requested by the terminal on-demand and a PRS configuration in the set of PRS configurations serves as a PRS configuration preconfigured for the terminal includes:

indicating to the terminal that a plurality of PRS configurations in the set of PRS configurations serve as PRS configurations preconfigured for the terminal and a PRS configuration corresponding to the set of PRS configurations serves as a PRS configuration requested on-demand.

In an example, in a case that the network device indicates to the terminal that a plurality of PRS configurations in the set of PRS configurations serve as PRS configurations preconfigured for the terminal, the network device can indicate that all PRS configurations in the set of PRS configurations serve as PRS configurations preconfigured for the terminal, which needs one bit to indicate in this case; and the network device can also indicate that one or more PRS configurations in the set of PRS configurations serve as PRS configurations preconfigured for the terminal, which needs a plurality of bits to indicate in this case.

In an example, in the case that the network device indicates that a PRS configuration in the set of PRS configurations merely serves as a PRS configuration preconfigured for the terminal, the network device may indicate that a plurality of PRS configurations in the set of PRS configurations serve as PRS configurations preconfigured for the terminal.

In an example, in the case that the network device indicates that a PRS configuration in the set of PRS configurations serves both as a PRS configuration requested by the terminal on-demand and as a PRS configuration preconfigured for the terminal, the network device may indicate that a plurality of PRS configurations in the set of PRS configurations serve as PRS configurations preconfigured for the terminal.

In an example, in a case that the network device indicates that a plurality of PRS configurations in the set of PRS configurations serve as PRS configurations preconfigured for the terminal, the terminal may merely use one of the preconfigured PRS configurations when needing to use the preconfigured PRS configurations in the positioning process, and then receive a downlink PRS on time-frequency resources corresponding to the selected PRS configuration.

An example of how the terminal selects one PRS configuration from among a plurality of PRS configurations as a preconfigured PRS configuration is illustrated below.

FIG. 2 is a schematic flowchart of another usage indication method according to an example of the present disclosure. As shown in FIG. 2, the method further includes step S201.

In step S201, transmitting positioning request information to the terminal, where the positioning request information carries indication information, and the indication information is configured to indicate that a first target PRS configuration among the plurality of PRS configurations serves as a PRS configuration.

In an example, in a case that the network device indicates that a plurality of PRS configurations in the set of PRS configurations serve as PRS configurations preconfigured for the terminal, the terminal will receive a downlink PRS according to one of the plurality of PRS configurations in the positioning process.

As a result, in a case that the network device needs to position the terminal and transmit a positioning request information to the terminal subsequently, the positioning request information may carry indication information, and the indication information is configured to indicate that a first target PRS configuration among the plurality of PRS configurations serves as a PRS configuration, so that the terminal may receive a downlink PRS according to the first target PRS configuration.

FIG. 3 is a schematic flowchart of yet another usage indication method according to an example of the present disclosure. As shown in FIG. 3, indicating to the terminal that a PRS configuration in the set of PRS configurations serves as a PRS configuration requested by the terminal on-demand and a PRS configuration in the set of PRS configurations serves as a PRS configuration preconfigured for the terminal includes step S301.

In step S301, indicating to the terminal that one or more PRS configurations in the set of PRS configurations serve as PRS configurations preconfigured for the terminal and a PRS configuration corresponding to the set of PRS configurations serves as a PRS configuration requested on-demand.

In an example, in the case that the network device indicates that a PRS configuration in the set of PRS configurations serves both as a PRS configuration requested by the terminal on-demand and as a PRS configuration preconfigured for the terminal, the network device may indicate that one or more PRS configurations in the set of PRS configurations serve as PRS configurations preconfigured for the terminal, so that the terminal may receive a downlink PRS based on the one or more PRS configurations.

Figures 4, 5:
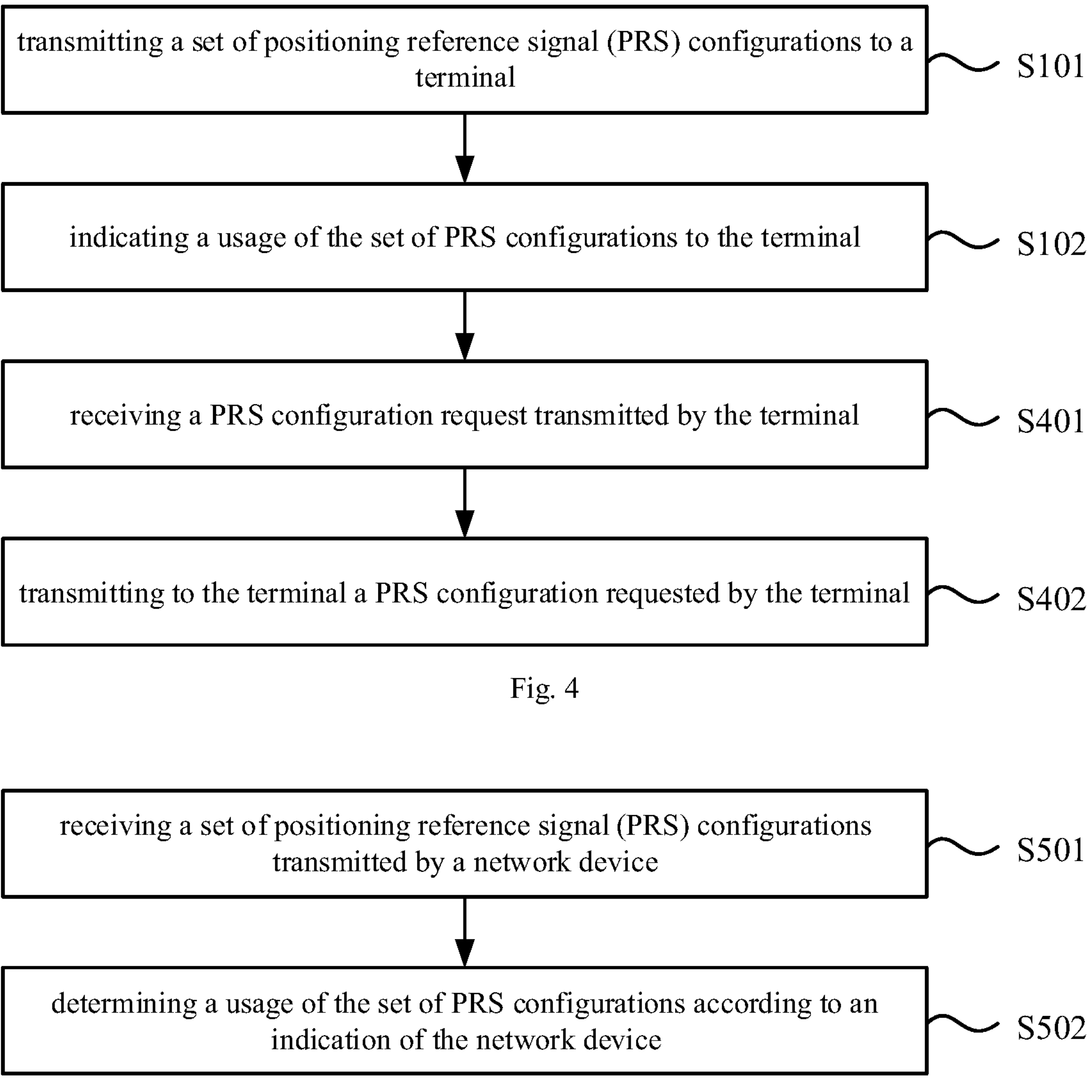
FIG. 4 is a schematic flowchart of yet another usage indication method according to an example of the present disclosure.
FIG. 5 is a schematic flowchart of a usage determination method according to an example of the present disclosure.

FIG. 4 is a schematic flowchart of yet another usage indication method according to an example of the present disclosure. As shown in FIG. 4, the method further includes steps S401 and S402.

In step S401, receiving a PRS configuration request transmitted by the terminal; and In step S402, transmitting to the terminal a PRS configuration requested by the terminal.

In an example, in a case that the network device indicates that one or more PRS configurations in the set of PRS configurations serve as PRS configurations preconfigured for the terminal, the one or more preconfigured PRS configurations may not meet the positioning requirements of the terminal. For example, in a case that the terminal needs higher precision of positioning, it needs a PRS configuration with a larger bandwidth and a shorter period, however, the preconfigured PRS configurations have a relatively smaller bandwidth and/or a relatively longer period.

Since the network device also indicates that a PRS configuration in the set of PRS configurations can also serve as a PRS configuration requested by the terminal on-demand, the terminal can select a PRS configuration other than the preconfigured PRS configurations in the set of PRS configurations as needed, and transmit a request to the network device to request for the selected PRS configuration. Further, the network device can transmit to the terminal the PRS configuration requested by the terminal, for example, indicate to the terminal that the selected PRS configuration is allowed to be used, for another example, transmit to the terminal an identifier corresponding to the PRS configuration selected by the terminal, and for yet another example, transmit to the terminal the PRS configuration selected by the terminal. In view of the above, it may be ensured that the terminal receives a downlink PRS according to the PRS configuration meeting the positioning requirements and the PRS is successfully received.

In an example, the method further includes: determining a usage of the set of PRS configurations provided for the terminal;

indicating the usage of the set of PRS configurations to the terminal includes:

in a case that the set of PRS configurations provided for the terminal serves both as a PRS configuration requested on-demand and as a PRS configuration preconfigured for the terminal, indicating to the terminal that a PRS configuration in the set of PRS configurations serves as a PRS configuration requested by the terminal on-demand, and a PRS configuration in the set of PRS configurations serves as a PRS configuration preconfigured for the terminal;

in a case that the set of PRS configurations provided for the terminal merely serves as on-demand PRS configurations, indicating to the terminal that a PRS configuration in the set of PRS configurations serves as a PRS configuration requested by the terminal on-demand; and in a case that the set of PRS configurations provided for the terminal merely serves as a PRS configuration preconfigured for the terminal, indicating to the terminal that a PRS configuration in the set of PRS configurations serves as a PRS configuration preconfigured for the terminal.

In an example, the set of PRS configurations provided by the network device for the terminal can have specified usages. For example, in the case that the set of PRS configurations provided for the terminal may merely serve as a PRS configuration requested on-demand, the PRS configuration may merely serve as a PRS configuration requested on-demand, thus indicating to the terminal that a PRS configuration in the set of PRS configurations serves as a PRS configuration requested by the terminal on-demand. For example, in the case that the set of PRS configurations provided for the terminal merely serves as a PRS configuration preconfigured for the terminal, the PRS configuration may merely serve as a PRS configuration preconfigured for the terminal, thus indicating to the terminal that a PRS configuration in the set of PRS configurations serves as a PRS configuration preconfigured for the terminal. For example, in the case that the set of PRS configurations provided for the terminal serves as a PRS configuration requested on-demand and as a PRS configuration preconfigured for the terminal, the PRS configuration may serve as a PRS configuration preconfigured for the terminal and as a PRS configuration requested on-demand, thus indicating to the terminal that a PRS configuration in the set of PRS configurations may serve as a PRS configuration requested by the terminal on-demand, and a PRS configuration in the set of PRS configurations may serve as a PRS configuration preconfigured for the terminal.

The network device can determine, according to the network capability and the positioning requirements, specified usages of the set of PRS configurations provided for the terminal. For example, in a case that the time delay for positioning is relatively low, the set of PRS configurations provided for the terminal may serve as a PRS configuration preconfigured for the terminal. For example, in a case that the network capability can support the PRS configuration requested on-demand, the set of PRS configurations provided for the terminal may serve as a PRS configuration requested on-demand. For example, in a case that the time delay for positioning is relatively low and the network capacity can support the PRS configuration requested on-demand, the set of PRS configurations provided for the terminal may serve as a PRS configuration preconfigured for the terminal and as a PRS configuration requested on-demand.

In an example, the network device includes a core network. The core network is configured to indicate to the terminal an indication information indicating the usage of the set of PRS configurations. The indication information may be carried in a Long Term Evolution (LTE) Positioning Protocol Message (LPP) transmitted by the core network to the terminal.

In the case that the network device is a core network, the core network (for example, the Location Management Function (LMF) in the core network) can carry the indication information indicating the usage of the set of PRS configurations in the LTE positioning protocol message transmitted (for example, transparently transmitted by the base station) to the terminal. For example, the indication information may be transmitted to the terminal before the terminal is positioned. For example, the indication information may be carried in LPP to provide assistance data. For example, the indication information may be transmitted to the terminal together with the positioning assistance information other than the PRS configuration.

In an example, the network device includes a base station. The base station is configured to indicate to the terminal an indication information indicating the usage of the set of PRS configurations. The indication information may be carried in a positioning system message broadcast by the base station.

In the case that the network device is a base station, the base station can carry the indication information indicating the usage of the set of PRS configurations in the broadcast positioning system message and transmit the indication information to the terminal. For example, a new type of positioning system messages may be defined to include the set of PRS configurations. For example, the newly defined type may be posSibType6-4.

It is to be noted that in this case, the source of a PRS configuration may be the core network, that is, the core network first transmits the PRS configuration as the positioning assistance information to the base station, and then the base station broadcasts the positioning system message carrying the positioning assistance information to the terminal.

FIG. 5 is a schematic flowchart of a usage determination method according to an example of the present disclosure. The usage determination method illustrated in this example may be executed by a terminal. The terminal may be used as a user equipment communicating with a network device. The network device includes but is not limited to a base station and a core network. The terminal includes but is not limited to a mobile phone, a tablet computer, a wearable device, a sensor, an Internet of Things device, and other communication apparatuses.

As shown in FIG. 5, the usage determination method may include steps S501 and S502.

In step S501, receiving a set of positioning reference signal (PRS) configurations transmitted by a network device; and In step S502, determining a usage of the set of PRS configurations according to an indication of the network device.

In an example, the network device can pre-configure positioning assistance information for the terminal, and can also configure a PRS configuration requested by the terminal on-demand. The positioning assistance information may include the PRS configuration. The terminal may receive a PRS according to the PRS configuration, and then perform a positioning process according to the received PRS.

In this case, in the case that the network device carries and transmits a PRS configuration as a preconfigured PRS configuration to the terminal and carries and transmits a set of PRS configurations as a PRS configuration requested on-demand to the terminal by means of signaling, more signaling resources will be occupied, resulting in a high signaling overhead.

According to the example of the present disclosure, the network device transmits the set of PRS configurations to the terminal by means of a piece of signaling, and indicates the usage of the set of PRS configurations to the terminal, without carrying, by means of the signaling, both a preconfigured PRS configuration and a PRS configuration requested on-demand, which is beneficial to saving signaling resources.

In an example, the network device may indicate the usage of the set of PRS configurations to the terminal in at least one of an explicit manner or an implicit manner.

In an explicit manner, for example, the network device can transmit a usage indication to the terminal to indicate the usage of the set of PRS configurations. There are three usages of the set of PRS configurations, that is, a PRS configuration in the set of PRS configurations serves as a PRS configuration requested by the terminal on-demand; alternatively, a PRS configuration in the set of PRS configurations serves as a PRS configuration preconfigured for the terminal; alternatively, a PRS configuration in the set of PRS configurations serves as both a PRS configuration requested by the terminal on-demand and a PRS configuration preconfigured for the terminal.

Since there are the above three usages of the set of PRS configurations, the usage indication may be set to occupy 2 bits, so as to realize the indication of the above three usages.

However, in the case that a PRS configuration in the set of PRS configurations is separately indicated, by means of a piece of signaling, to serve as a PRS configuration requested by the terminal on-demand, this signaling needs to indicate the whole set of PRS configurations, and the resources to be occupied are more than 2 bits.

Moreover, in the case that a PRS configuration in the set of PRS configurations is separately indicated, by means of a piece of signaling, to serve as a PRS configuration preconfigured for the terminal, this signaling needs to be able to indicate at least each PRS configuration in the set of PRS configurations, and the occupied resources are also more than 2 bits.

As a result, in the case that the usage of the set of PRS configurations is indicated in an explicit manner, compared with both carrying and transmitting a set of PRS configurations as a preconfigured PRS configuration to the terminal and carrying and transmitting a set of PRS configurations as a PRS configuration requested on-demand to the terminal by means of the signaling, relatively few resources are occupied, which is beneficial to saving signaling resources.

In an implicit manner, for example, after the network device transmits the set of PRS configurations to the terminal, in a case that the usage indication is not transmitted, the set of PRS configurations serves as a PRS configuration requested by the terminal on-demand by default, and in a case that the usage indication is transmitted, the network device indicates to the terminal by default that one or more PRS configurations in the set of PRS configurations serve as PRS configurations preconfigured for the terminal. Regardless of whether the usage indication is transmitted or not, compared with both carrying and transmitting a set of PRS configurations as a preconfigured PRS configuration to the terminal and carrying and transmitting a set of PRS configurations as a PRS configuration requested on-demand to the terminal by means of signaling, relatively few resources are occupied, which is beneficial to saving signaling resources.

It is to be noted that in a manner of implicit indication, in a case that the usage indication is not transmitted, a PRS configuration in the set of PRS configurations also serves as a PRS configuration preconfigured for the terminal by default. The usage indication being not transmitted specifically indicating which type of usages by default may be agreed in a communication protocol between the base station and the terminal.

In an example, determining the usage of the set of PRS configurations according to the indication of the network device includes one of:

- determining, according to the indication of the network device, that a PRS configuration in the set of PRS configurations serves as a PRS configuration requested by the terminal on-demand and a PRS configuration in the set of PRS configurations serves as a PRS configuration preconfigured for the terminal;
- determining, according to the indication of the network device, that a PRS configuration in the set of PRS configurations serves as a PRS configuration requested by the terminal on-demand; or
- determining, according to the indication of the network device, that a PRS configuration in the set of PRS configurations serves as a PRS configuration preconfigured for the terminal.

It is to be noted that the indication of the usage of the set of PRS configurations may be directed to the whole set of PRS configurations, that is, indicating the usage of all PRS configurations in the set of PRS configurations; or be directed to a part of PRS configurations in the set of PRS configurations, that is, indicating the usage of one or more PRS configurations in the set of PRS configurations.

The network device can indicate that a PRS configuration in the set of PRS configurations merely serves as a PRS configuration requested by the terminal on-demand. In this case, the terminal can select a PRS configuration that needs to be requested in the set of PRS configurations, and generate an on-demand PRS configuration request and transmit the request to the network device to request for the selected PRS configuration. After receiving the request from the terminal, the network device can transmit to the terminal the PRS configuration requested by the terminal, for example, indicate to the terminal that the selected PRS configuration is allowed to be used, for another example, transmit to the terminal an identifier corresponding to the PRS configuration selected by the terminal, and for yet another example, transmit to the terminal the PRS configuration selected by the terminal.

The network device can indicate that a PRS configuration in the set of PRS configurations merely serves as a PRS configuration preconfigured for the terminal. In this case, the terminal can directly use the preconfigured PRS configuration to receive a downlink PRS in the positioning process. Further, the terminal cannot transmit an on-demand PRS configuration request to the network device. Alternatively, the terminal can transmit an on-demand PRS configuration request to the network device, however, the PRS configuration requested by the on-demand PRS configuration request does not include the PRS configuration and/or the PRS configuration identifier in the set of PRS configurations, so as to prevent the network device from not supporting the requested PRS configuration and/or not identifying the PRS configuration identifier requested by the terminal.

The network device can indicate that a PRS configuration in the set of PRS configurations serves as a PRS configuration requested by the terminal on-demand, and indicate that a PRS configuration in the set of PRS configurations also serves as a PRS configuration preconfigured for the terminal. In this case, on the one hand, the terminal can take one or more PRS configurations in the set of PRS configurations as preconfigured PRS configurations according to an indication of the network device, and on the other hand, the terminal can also transmit an on-demand PRS configuration request to the network device according to the set of PRS configurations, for example, select a PRS configuration in the set of PRS configurations and transmit the on-demand PRS configuration request to the network device to request for the selected PRS configuration. For example, in the case that the preconfigured PRS configuration does not meet the requirements of the terminal, the terminal can select a PRS configuration that meets the requirements of the terminal from the PRS configurations other than the preconfigured PRS configuration in the set of PRS configurations, and transmit the on-demand PRS configuration request to the network device to request for the selected PRS configuration.

In addition, in the case of indicating that a plurality of PRS configurations in the set of PRS configurations serve as preconfigured PRS configurations and a PRS configuration in the set of PRS configurations serve as a PRS configuration requested on-demand, the network device can indicate, when transmitting a positioning request information to the terminal in the subsequent positioning process, that one PRS configuration among the plurality of PRS configurations serves as the PRS configuration for use by the terminal by means of the positioning request information. In this case, the terminal can determine whether the PRS configuration indicated by the positioning request information meets the requirements (for example, positioning requirements), and if not, the terminal can select a PRS configuration that meets the requirements of the terminal from the PRS configurations other than the PRS configuration indicated by the positioning request information in the set of PRS configurations, and transmit an on-demand PRS configuration request to the network device to request for the selected PRS configuration.

In an example, determining, according to the indication of the network device, that a PRS configuration in the set of PRS configurations serves as a PRS configuration requested by the terminal on-demand includes:

- determining, according to the indication of the network device, that a plurality of PRS configurations in the set of PRS configurations serve as PRS configurations preconfigured for the terminal;
- alternatively, determining, according to the indication of the network device, that a PRS configuration in the set of PRS configurations serves as a PRS configuration requested by the terminal on-demand and a PRS configuration in the set of PRS configurations serves as a PRS configuration preconfigured for the terminal includes:
- determining, according to the indication of the network device, that a plurality of PRS configurations in the set of PRS configurations serve as PRS configurations preconfigured for the terminal and a PRS configuration corresponding to the set of PRS configurations serves as a PRS configuration requested on-demand.

In an example, in a case that the network device indicates to the terminal that a plurality of PRS configurations in the set of PRS configurations serve as PRS configurations preconfigured for the terminal, the network device can indicate that all PRS configurations in the set of PRS configurations serve as PRS configurations preconfigured for the terminal, which needs one bit to indicate in this case; and the network device can also indicate that one or more PRS configurations in the set of PRS configurations serve as PRS configurations preconfigured for the terminal, which needs a plurality of bits to indicate in this case.

In an example, in the case that the network device indicates that a PRS configuration in the set of PRS configurations merely serves as a PRS configuration preconfigured for the terminal, the network device may indicate that a plurality of PRS configurations in the set of PRS configurations serve as PRS configurations preconfigured for the terminal.

In an example, in the case that the network device indicates that a PRS configuration in the set of PRS configurations serves both as a PRS configuration requested by the terminal on-demand and as a PRS configuration preconfigured for the terminal, the network device may indicate that a plurality of PRS configurations in the set of PRS configurations serve as PRS configurations preconfigured for the terminal.

In an example, in a case that the network device indicates that a plurality of PRS configurations in the set of PRS configurations serve as PRS configurations preconfigured for the terminal, the terminal may merely use one of the preconfigured PRS configurations when needing to use the preconfigured PRS configurations in the positioning process, and then receive a downlink PRS on time-frequency resources corresponding to the selected PRS configuration.

An example of how the terminal selects one PRS configuration from among a plurality of PRS configurations as a preconfigured PRS configuration is illustrated below.

Figure 6:
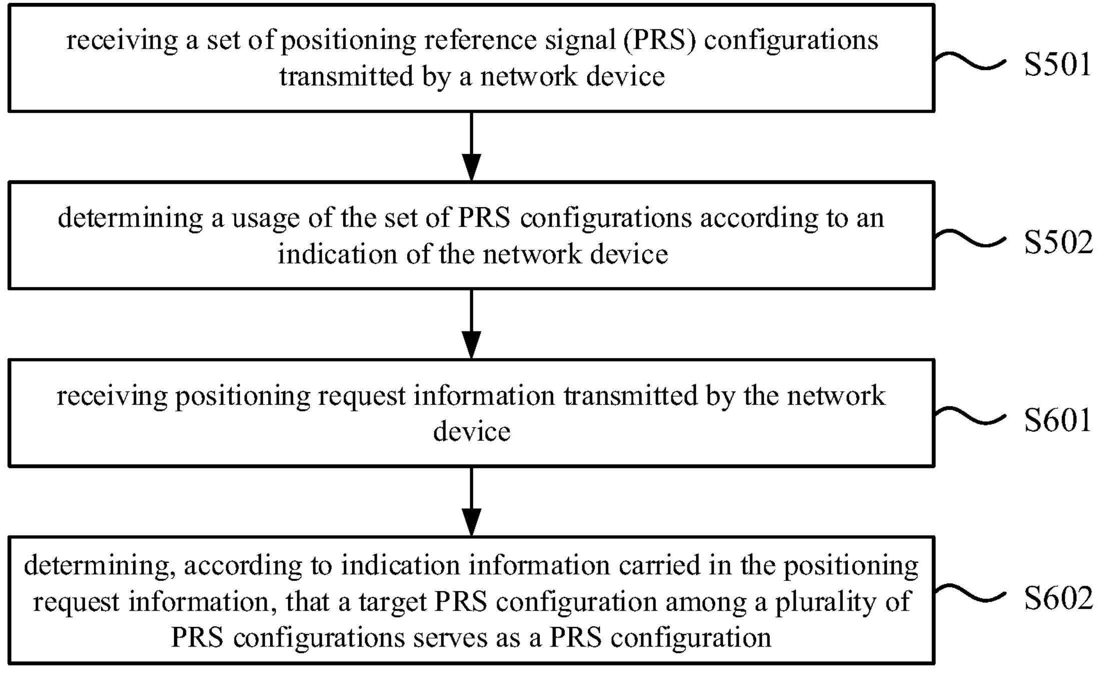
FIG. 6 is a schematic flowchart of another usage determination method according to an example of the present disclosure.

FIG. 6 is a schematic flowchart of another usage determination method according to an example of the present disclosure. As shown in FIG. 6, the method further includes step S601 and S602.

In step S601, receiving positioning request information transmitted by the network device.

In step S602, determining, according to indication information carried in the positioning request information, that a first target PRS configuration among the plurality of PRS configurations serves as a PRS configuration.

In an example, in a case that the network device indicates that a plurality of PRS configurations in the set of PRS configurations serve as PRS configurations preconfigured for the terminal, the terminal will receive a downlink PRS according to one of the plurality of PRS configurations in the positioning process.

As a result, in a case that the network device needs to position the terminal and transmit a positioning request information to the terminal subsequently, the positioning request information may carry indication information, and the indication information is configured to indicate that a first target PRS configuration among the plurality of PRS configurations serves as a PRS configuration. The terminal can determine, according to the indication information carried in the positioning request information, that the first target PRS configuration among the plurality of PRS configurations serves as a PRS configuration, and then receive a downlink PRS according to the first target PRS configuration.

Figure 7:
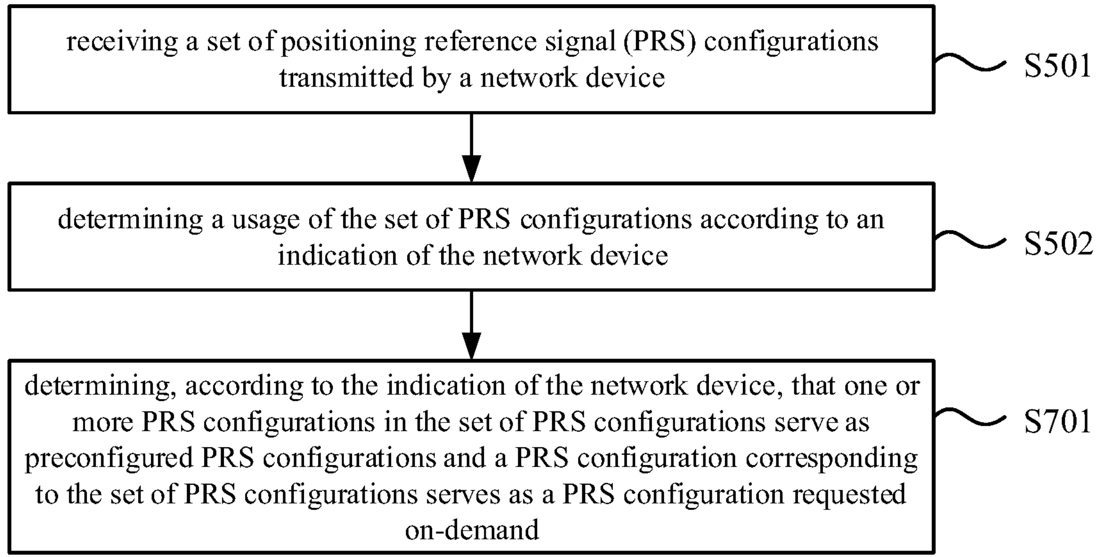
FIG. 7 is a schematic flowchart of yet another usage determination method according to an example of the present disclosure.

FIG. 7 is a schematic flowchart of yet another usage determination method according to an example of the present disclosure. As shown in FIG. 7, determining, according to the indication of the network device, that a PRS configuration in the set of PRS configurations serves as the PRS configuration requested by the terminal on-demand and a PRS configuration in the set of PRS configurations serves as the PRS configuration preconfigured for the terminal includes step S701.

In step S701, determining, according to the indication of the network device, that one or more PRS configurations in the set of PRS configurations serve as preconfigured PRS configurations and a PRS configuration corresponding to the set of PRS configurations serves as a PRS configuration requested on-demand.

In an example, in the case that the network device indicates that a PRS configuration in the set of PRS configurations serves as a PRS configuration requested by the terminal on-demand and as a PRS configuration preconfigured for the terminal, the network device may indicate that one or more PRS configurations in the set of PRS configurations serve as PRS configurations preconfigured for the terminal, so that the terminal may receive a downlink PRS based on the one or more PRS configurations.

Figures 8, 9:
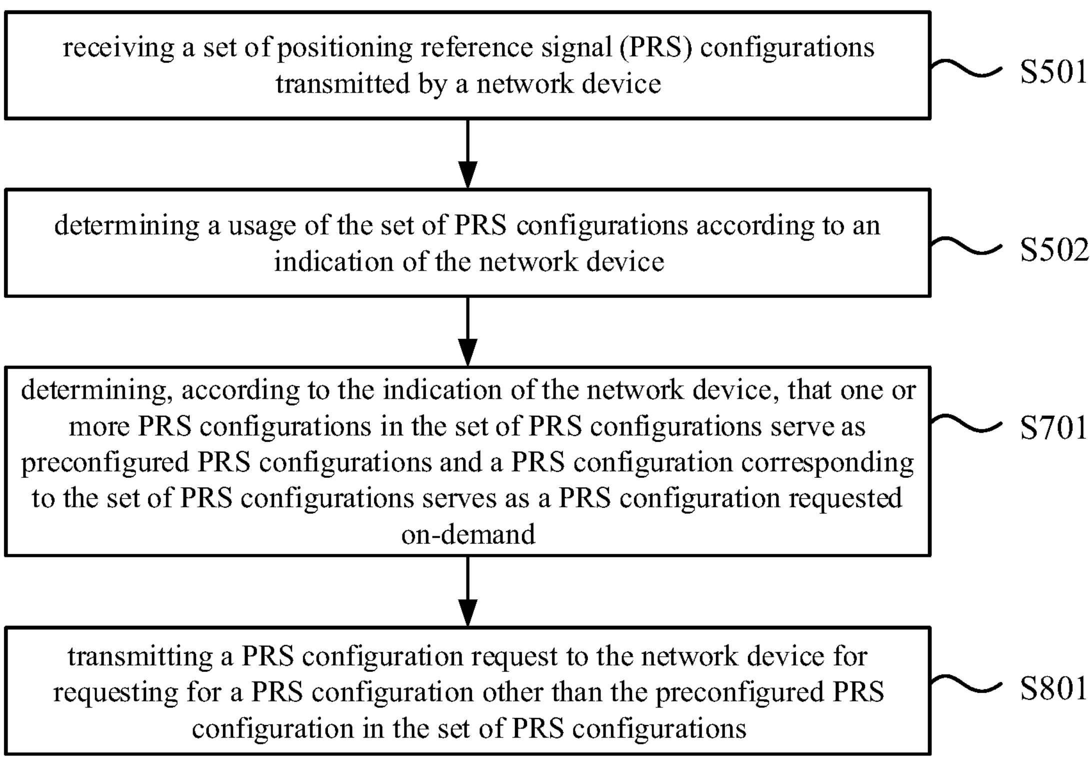
FIG. 8 is a schematic flowchart of yet another usage determination method according to an example of the present disclosure.
FIG. 9 is a schematic block diagram of a usage indication apparatus according to an example of the present disclosure.

FIG. 8 is a schematic flowchart of yet another usage determination method according to an example of the present disclosure. As shown in FIG. 8, the method further includes step S801.

In step S801, in a case that the preconfigured PRS configuration does not meet requirements, transmitting a PRS configuration request to the network device for requesting for a PRS configuration other than the preconfigured PRS configuration in the set of PRS configurations.

In an example, in a case that the network device indicates that one or more PRS configurations in the set of PRS configurations serve as PRS configurations preconfigured for the terminal, the one or more preconfigured PRS configurations may not meet the positioning requirements of the terminal. For example, in a case that the terminal needs higher precision of positioning, it needs a PRS configuration with a larger bandwidth and a shorter period, however, the preconfigured PRS configurations have a relatively smaller bandwidth and/or a relatively longer period.

Since the network device also indicates that a PRS configuration in the set of PRS configurations can also serve as a PRS configuration requested by the terminal on-demand, the terminal can select a PRS configuration other than the preconfigured PRS configurations in the set of PRS configurations as needed, and transmit a request to the network device to request for the selected PRS configuration. Further, the network device can transmit to the terminal the PRS configuration requested by the terminal, for example, indicate to the terminal that the selected PRS configuration is allowed to be used, for another example, transmit to the terminal an identifier corresponding to the PRS configuration selected by the terminal, and for yet another example, transmit to the terminal the PRS configuration selected by the terminal. In view of the above, it may be ensured that the terminal receives a downlink PRS according to the PRS configuration meeting the positioning requirements and the PRS is successfully received.

In an example, it is determined, according to the indication of the network device, that a plurality of PRS configurations in the set of PRS configurations serve as preconfigured PRS configurations, the method further includes:

determining, according to the positioning request information of the network device, that a second target PRS configuration among the plurality of PRS configurations serves as a PRS configuration; and in the case that the second target PRS configuration does not meet the requirements, transmitting a PRS configuration request to the network device for requesting for a PRS configuration other than the second target PRS configuration in the set of PRS configurations.

In an example, in a case that the network device indicates that the second target PRS configuration in the set of PRS configurations serves as a PRS configuration, the second target PRS configuration may not meet the positioning requirements of the terminal. For example, in a case that the terminal needs higher precision of positioning, it needs a PRS configuration with a larger bandwidth and a shorter period, however, the second target PRS configuration has a relatively smaller bandwidth and/or a relatively longer period.

Since the network device also indicates that a PRS configuration in the set of PRS configurations can also serve as a PRS configuration requested by the terminal on-demand, the terminal can select a PRS configuration other than the second target PRS configuration in the set of PRS configurations as needed, and transmit a request to the network device to request for the selected PRS configuration. Further, the network device can transmit to the terminal the PRS configuration requested by the terminal, for example, indicate to the terminal that the selected PRS configuration is allowed to be used, for another example, transmit to the terminal an identifier corresponding to the PRS configuration selected by the terminal, and for yet another example, transmit to the terminal the PRS configuration selected by the terminal. In view of the above, it may be ensured that the terminal receives a downlink PRS according to the PRS configuration meeting the positioning requirements and the PRS is successfully received.

In an example, the network device includes a core network. The core network is configured to indicate to the terminal an indication information indicating the usage of the set of PRS configurations. The indication information may be carried in a LTE Positioning Protocol Message transmitted by the core network to the terminal.

In the case that the network device is a core network, the core network (for example, the Location Management Function (LMF) in the core network) can carry the indication information indicating the usage of the set of PRS configurations in the LTE positioning protocol message transmitted (for example, transparently transmitted by the base station) to the terminal. For example, the indication information may be transmitted to the terminal before the terminal is positioned. For example, the indication information may be carried in LPP provide assistance data. For example, the indication information may be transmitted to the terminal together with the positioning assistance information other than the PRS configuration.

In an example, the network device includes a base station. The base station is configured to indicate to the terminal an indication information indicating the usage of the set of PRS configurations. The indication information may be carried in a positioning system message broadcast by the base station.

In the case that the network device is a base station, the base station can carry the indication information indicating the usage of the set of PRS configurations in the broadcast positioning system message and transmit the indication information to the terminal. For example, a new type of positioning system messages may be defined to include the set of PRS configurations. For example, the newly defined type is posSibType6-4.

It is to be noted that in this case, the source of a PRS configuration may be the core network, that is, the core network first transmits the PRS configuration as the positioning assistance information to the base station, and then the base station broadcasts the positioning system message carrying the positioning assistance information to the terminal.

Corresponding to the examples of the usage indication method and the usage determination method described above, the present disclosure further provides examples of a usage indication apparatus and a usage determination apparatus.

An example of the present disclosure further provides a usage indication apparatus. The usage indication apparatus illustrated in this example may be applied to a network device. The network device includes but is not limited to a base station and a core network. The network device can communicate with a terminal as a user equipment. The terminal includes but is not limited to a mobile phone, a tablet computer, a wearable device, a sensor, an Internet of Things device and other communication apparatuses.

In an example, the usage indication apparatus includes one or more processors, the processors being configured to transmit a set of positioning reference signal (PRS) configurations to a terminal; and indicate a usage of the set of PRS configurations to the terminal.

In an example, the processors are configured to indicate to the terminal that a PRS configuration in the set of PRS configurations serves as a PRS configuration requested by the terminal on-demand and a PRS configuration in the set of PRS configurations serves as a PRS configuration preconfigured for the terminal;

alternatively, indicate to the terminal that a PRS configuration in the set of PRS configurations serves as a PRS configuration requested by the terminal on-demand;

alternatively, indicate to the terminal that a PRS configuration in the set of PRS configurations serves as a PRS configuration preconfigured for the terminal.

In an example, the processors are configured to indicate to the terminal that a plurality of PRS configurations in the set of PRS configurations serve as PRS configurations preconfigured for the terminal;

alternatively, the processors are configured to indicate to the terminal that a plurality of PRS configurations in the set of PRS configurations serve as PRS configurations preconfigured for the terminal and a PRS configuration corresponding to the set of PRS configurations serves as a PRS configuration requested on-demand.

In an example, the processors are further configured to transmit positioning request information to the terminal, where the positioning request information carries indication information, and the indication information is configured to indicate that a first target PRS configuration among the plurality of PRS configurations serves as a PRS configuration.

In an example, the processors are configured to indicate to the terminal that one or more PRS configurations in the set of PRS configurations serve as PRS configurations preconfigured for the terminal and a PRS configuration corresponding to the set of PRS configurations serves as a PRS configuration requested on-demand.

In an example, the processors are further configured to receive a PRS configuration request transmitted by the terminal; and transmit to the terminal a PRS configuration requested by the terminal.

In an example, the processors are further configured to determine a usage of the set of PRS configurations provided for the terminal;

and the processors are configured to: in a case that the set of PRS configurations provided for the terminal serves as a PRS configuration requested on-demand and as a PRS configuration preconfigured for the terminal, indicate to the terminal that a PRS configuration in the set of PRS configurations serves as a PRS configuration requested by the terminal on-demand, and a PRS configuration in the set of PRS configurations serves as a PRS configuration preconfigured for the terminal;

in a case that the set of PRS configurations provided for the terminal merely serves as an on-demand PRS configuration, indicate to the terminal that a PRS configuration in the set of PRS configurations serves as a PRS configuration requested by the terminal on-demand; and in a case that the set of PRS configurations provided for the terminal merely serves as a PRS configuration preconfigured for the terminal, indicate to the terminal that a PRS configuration in the set of PRS configurations serves as a PRS configuration preconfigured for the terminal.

In an example, the processors are configured to indicate the usage of the set of PRS configurations to the terminal in at least one of an explicit manner or an implicit manner.

In an example, the network device includes a core network. The core network is configured to indicate to the terminal an indication information indicating the usage of the set of PRS configurations. The indication information may be carried in a LTE Positioning Protocol Message transmitted by the core network to the terminal.

In an example, the network device includes a base station. The base station is configured to indicate to the terminal an indication information indicating the usage of the set of PRS configurations. The indication information may be carried in a positioning system message broadcast by the base station.

An example of the present disclosure further provides a usage determination apparatus. The usage determination apparatus illustrated in this example may be applied to a terminal. The terminal as a user equipment can communicate with a network device. The network device includes but is not limited to a base station and a core network. The terminal includes but is not limited to a mobile phone, a tablet computer, a wearable device, a sensor, an Internet of Things device, and other communication apparatuses.

In an example, the usage determination apparatus includes one or more processors, the processors being configured to receive a set of positioning reference signal (PRS) configuration transmitted by a network device; and determine a usage of the set of PRS configurations according to an indication of the network device.

In an example, the processors are configured to determine, according to the indication of the network device, that a PRS configuration in the set of PRS configurations serves as a PRS configuration requested by the terminal on-demand and a PRS configuration in the set of PRS configurations serves as a PRS configuration preconfigured for the terminal;

alternatively, determine, according to the indication of the network device, that a PRS configuration in the set of PRS configurations serves as a PRS configuration requested by the terminal on-demand;

alternatively, determine, according to the indication of the network device, that a PRS configuration in the set of PRS configurations serves as a PRS configuration preconfigured for the terminal.

In an example, the processors are configured to determine, according to the indication of the network device, that a plurality of PRS configurations in the set of PRS configurations serve as PRS configurations preconfigured for the terminal;

alternatively, the processors are configured to determine, according to the indication of the network device, that a plurality of PRS configurations in the set of PRS configurations serve as PRS configurations preconfigured for the terminal and a PRS configuration corresponding to the set of PRS configurations serves as a PRS configuration requested on-demand.

In an example, the processors are further configured to receive positioning request information transmitted by the network device; and determine, according to indication information carried in the positioning request information, that a first target PRS configuration among the plurality of PRS configurations serves as a PRS configuration.

In an example, the processors are configured to indicate to the terminal that one or more PRS configurations in the set of PRS configurations serve as PRS configurations preconfigured for the terminal and a PRS configuration corresponding to the set of PRS configurations serves as a PRS configuration requested on-demand.

In an example, the processors are further configured to transmit a PRS configuration request to the network device for requesting for a PRS configuration other than the preconfigured PRS configurations in the set of PRS configurations.

In an example, the network device includes a core network. The core network is configured to indicate to the terminal an indication information indicating the usage of the set of PRS configurations. The indication information may be carried in a LTE Positioning Protocol Message transmitted by the core network to the terminal.

In an example, the network device includes a base station. The base station is configured to indicate to the terminal an indication information indicating the usage of the set of PRS configurations. The indication information may be carried in a positioning system message broadcast by the base station.

With regard to the apparatuses in the above examples, specific ways in which each module performs operations have been described in detail in the examples of related methods, which will not be described in detail here.

Since apparatuses examples basically correspond to the method examples, it is sufficient to refer to the partial description of the method examples for the relevant points. The apparatuses examples described above are schematic, where the modules described as separate components may or may not be physically separated, and the components displayed as modules may or may not be physical modules, that is, the components may be located in one place or distributed to a plurality of network modules. Some or all of the modules may be selected according to actual needs to achieve the purpose of the solutions of the examples. Those of ordinary skill in the art can understand and implement the purpose without creative effects.

An example of the present disclosure further provides a communication apparatus, including a processor; and a memory in which a computer program is stored, where the computer program, when executed by the processor, implements the usage indication method described in any of the above examples.

An example of the present disclosure further provides a communication apparatus, including a processor; and a memory in which a computer program is stored, where the computer program, when executed by the processor, implements the usage determination method described in any of the above examples.

An example of the present disclosure further provides a non-transitory computer-readable storage medium in which a computer program is stored, where the computer program, when executed by a processor, implements steps in the usage indication method described in any of the above examples.

An example of the present disclosure further provides a non-transitory computer-readable storage medium in which a computer program is stored, where the computer program, when executed by a processor, implements steps in the usage determination method described in any of the above examples.

As shown in FIG. 9, FIG. 9 is a schematic block diagram of a usage indication apparatus 900 according to an example of the present disclosure. The apparatus 900 may be provided as a base station. Referring to FIG. 9, the apparatus 900 includes a processing component 922, a wireless transmitting/receiving component 924, an antenna component 926, and a signal processing part unique to a wireless interface. The processing component 922 may further include one or more processors. One of the processors in the processing component 922 may be configured to implement the usage indication method described in any of the above examples.

Figure 10:
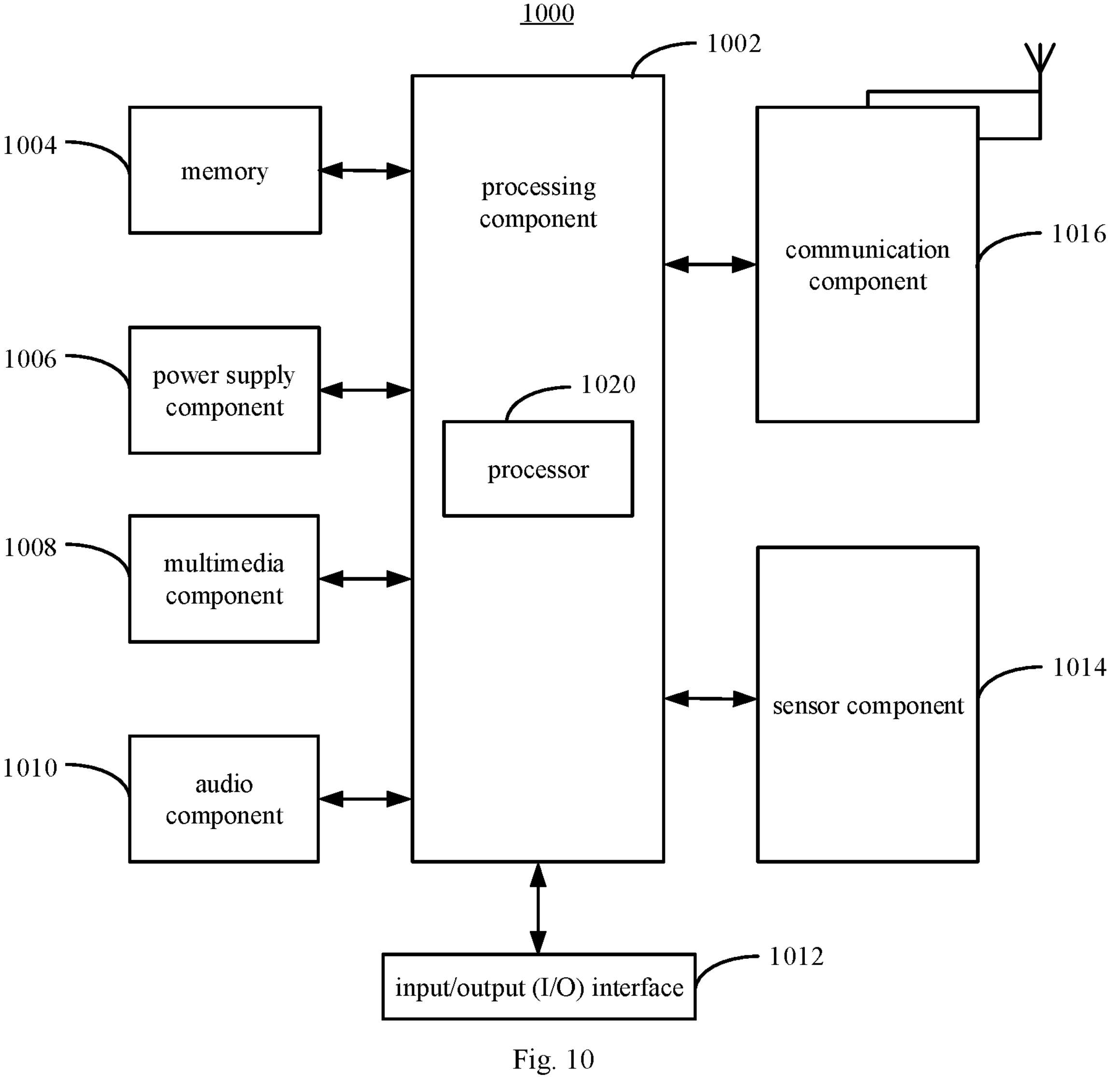
FIG. 10 is a schematic block diagram of a usage determination apparatus according to an example of the present disclosure.

FIG. 10 is a schematic block diagram of a usage determination apparatus 1000 according to an example of the present disclosure. For example, the apparatus 1000 may be a mobile phone, a computer, a digital broadcasting terminal, a messaging device, a game console, a tablet device, a medical device, a fitness device, a personal digital assistant, and the like.

Referring to FIG. 10, the apparatus 1000 may include one or more of the following components: a processing component 1002, a memory 1004, a power supply component 1006, a multimedia component 1008, an audio component 1010, an input/output (I/O) interface 1012, a sensor component 1014, and a communication component 1016.

The processing component 1002 generally controls the overall operation of the apparatus 1000, such as operations associated with display, telephone call, data communication, camera operations and recording operations. The processing component 1002 may include one or more processors 1020 to execute instructions, so as to complete all or part of the steps of the usage determination method described above. In addition, the processing component 1002 may include one or more modules to facilitate the interaction between the processing component 1002 and other components. For example, the processing component 1002 may include a multimedia module to facilitate interaction between the multimedia component 1008 and the processing component 1002.

The memory 1004 is configured to store various types of data, so as to support operations of the apparatus 1000. Examples of these data include instructions for any application or method operating on the apparatus 1000, contact data, phone book data, messages, pictures, videos, and the like. The memory 1004 may be implemented by any type of volatile or nonvolatile storage devices or their combinations, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power supply component 1006 provides power to various components of the apparatus 1000. The power supply component 1006 may include a power management system, one or more power supplies, and other components associated with generating, managing and distributing power for the apparatus 1000.

The multimedia component 1008 includes a screen that provides an output interface between the apparatus 1000 and the user. In some examples, the screen may include a Liquid Crystal Display (LCD) and a Touch Panel (TP). In the case that the screen includes a touch panel, the screen may be implemented as a touch screen to receive an input signal from the user. The touch panel includes one or more touch sensors to sense touch, sliding and gestures on the touch panel. The touch sensor may not only sense the boundary of a touch or sliding action, but also detect the duration and pressure related to the touch or sliding operation. In some examples, the multimedia component 1008 includes a front camera and/or a rear camera. In response to determining that the apparatus 1000 is in an operation mode, such as a shooting mode or a video mode, the front camera and/or the rear camera may receive external multimedia data. Both the front camera and the rear camera may be a fixed optical lens system or have a focal length and an optical zoom capability.

The audio component 1010 is configured to output and/or input an audio signal. For example, the audio component 1010 includes a microphone (MIC), which is configured to receive external audio signals when the apparatus 1000 is in operation modes, such as a call mode, a recording mode and a voice recognition mode. The received audio signal may be further stored in the memory 1004 or transmitted via the communication component 1016. In some examples, the audio component 1010 further includes a speaker for outputting audio signals.

The I/O interface 1012 is an interface provided between the processing component 1002 and a peripheral interface module. The peripheral interface module may be a keyboard, a click wheel, a button, etc. These buttons may include but are not limited to a home button, a volume button, a start button and a lock button.

The sensor component 1014 includes one or more sensors, which are configured to provide the state evaluation of various aspects to the apparatus 1000. For example, the sensor component 1014 can detect an on/off state of the apparatus 1000 and relative positioning of components, such as a display and a keypad of the apparatus 1000. The sensor component 1014 can further detect position change of the apparatus 1000 or a component of the apparatus 1000, the presence or absence of user contact with the apparatus 1000, the orientation or acceleration/deceleration of the apparatus 1000 and the temperature change of the apparatus 1000. The sensor component 1014 may include a proximity sensor, which is configured to detect the presence of a nearby object without any physical contact. The sensor component 1014 may further include an optical sensor, such as a CMOS or CCD image sensor, for use in an imaging application. In some examples, the sensor component 1014 may further include an acceleration sensor, a gyro sensor, a magnetic sensor, a pressure sensor or a temperature sensor.

The communication component 1016 is configured to facilitate wired or wireless communications between the apparatus 1000 and other apparatuses. The apparatus 1000 can access a wireless network based on communication standards, such as Wi-Fi, 2G or 3G, 4G LTE, 5G NR or their combination. In an example, the communication component 1016 receives a broadcast signal or broadcast-related information from an external broadcast management system via a broadcast channel. In an example, the communication component 1016 further includes a Near Field Communication (NFC) module to facilitate short-range communication. For example, the NFC module may be implemented based on a Radio Frequency Identification (RFID) technology, an Infrared Data Association (IrDA) technology, an Ultra-Wideband (UWB) technology, a Bluetooth (BT) technology and other technologies.

In an example, the apparatus 1000 may be implemented by one or more of an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, or other electronic components for performing the above usage determination method.

In an example, there is further provided a non-transitory computer-readable storage medium including instructions, such as the memory 1004 including instructions. The above instructions may be executed by the processor 1020 of the apparatus 1000 to complete the above usage determination method. For example, the non-transitory computer-readable storage medium may be a ROM, a Random Access Memory (RAM), a CD-ROM, a magnetic tape, a floppy disk, an optical data storage device, etc.

Other examples of the present disclosure will readily come to those skilled in the art upon consideration of the specification and practice of the present disclosure. The present disclosure is intended to cover any variations, uses, or adaptive changes of the present disclosure that follow the general principles of the present disclosure and include common general knowledge or customary technical means in the technical field not disclosed in the present disclosure. The specification and the embodiments are to be regarded as examples merely, and the following claims indicate the true scope and spirit of the present disclosure.

It is to be understood that the present disclosure is not limited to the precise structure that has been described above and shown in the accompanying drawings, and various modifications and changes may be made without departing from the scope of the present disclosure. The scope of the present disclosure is limited merely by the appended claims.

It is to be noted that, in the present disclosure, relational terms such as first and second are merely used to distinguish one entity or operation from another, and do not necessarily require or imply is the existence of any such actual relationship or order between these entities or operations. The terms "including," "containing," or any other variation of the terms are intended to cover non-exclusive inclusion, so that a process, method, article, or device including a series of elements includes not only those elements, but also other elements that are not explicitly listed or elements inherent to such process, method, article or device. Without further restrictions, the fact that an element is defined by the phrase "including a . . . " does not exclude the existence of other identical elements in the process, method, article, or device including the element.

The methods and apparatuses provided by the examples of the present disclosure have been described in detail above, and the principles and implementations of the present disclosure have been set forth with specific examples in the present disclosure. The description of the above example is used to help understand the methods of the present disclosure and the core idea of the methods. At the same time, according to the idea of the present disclosure, there will be changes in the specific implementations and application scope for those of ordinary skill in the art. In summary, the content of the specification is not to be understood as limitations to the present disclosure.

The invention claimed is:

1. A usage indication method, performed by a network device, wherein the network device can pre-configure positioning assistance information for a terminal, the network device can also configure a positioning reference signal (PRS) configuration requested by the terminal on-demand, and the method comprises:

transmitting a set of PRS configurations to the terminal; and indicating a usage of the set of PRS configurations to the terminal;

wherein indicating the usage of the set of PRS configurations to the terminal comprises one of:

indicating to the terminal that a PRS configuration in the set of PRS configurations serves as the PRS configuration requested by the terminal on-demand and the PRS configuration in the set of PRS configurations serves as a PRS configuration preconfigured for the terminal;

indicating to the terminal that a PRS configuration in the set of PRS configurations serves as the PRS configuration requested by the terminal on-demand; or indicating to the terminal that a PRS configuration in the set of PRS configurations serves as a PRS configuration preconfigured for the terminal.

2. The usage indication method according to claim 1, wherein indicating to the terminal that the PRS configuration in the set of PRS configurations serves as the PRS configuration preconfigured for the terminal comprises:

indicating to the terminal that a plurality of PRS configurations in the set of PRS configurations serve as PRS configurations preconfigured for the terminal; or indicating to the terminal that the PRS configuration in the set of PRS configurations serves as the PRS configuration requested by the terminal on-demand and the PRS configuration in the set of PRS configurations serves as the PRS configuration preconfigured for the terminal comprises:

indicating to the terminal that a plurality of PRS configurations in the set of PRS configurations serve as PRS configurations preconfigured for the terminal and a PRS configuration corresponding to the set of PRS configurations serves as the PRS configuration requested on-demand.

3. The usage indication method according to claim 2, wherein the usage indication method further comprises:

transmitting positioning request information to the terminal, wherein the positioning request information carries indication information, and the indication information is configured to indicate that a first target PRS configuration among the plurality of PRS configurations serves as a PRS configuration.

4. The usage indication method according to claim 1, wherein indicating to the terminal that the PRS configuration in the set of PRS configurations serves as the PRS configuration requested by the terminal on-demand and the PRS configuration in the set of PRS configurations serves as the PRS configuration preconfigured for the terminal comprises:

indicating to the terminal that one or more PRS configurations in the set of PRS configurations serve as PRS configurations preconfigured for the terminal and a PRS configuration corresponding to the set of PRS configurations serves as the PRS configuration requested on-demand.

5. The usage indication method according to claim 4, wherein the usage indication method further comprises:

receiving a PRS configuration request transmitted by the terminal; and transmitting to the terminal a PRS configuration requested by the terminal.

6. The usage indication method according to claim 1, wherein the usage indication method further comprises:

determining the usage of the set of PRS provided for the terminal;

indicating the usage of the set of PRS configurations to the terminal comprises:

in the case that the set of PRS configurations provided for the terminal serves as the PRS configuration requested on-demand and as the PRS configuration preconfigured for the terminal, indicating to the terminal that the PRS configuration in the set of PRS configurations serves as the PRS configuration requested by the terminal on-demand and the PRS configuration in the set of PRS configurations serves as the PRS configuration preconfigured for the terminal;

in the case that the set of PRS configurations provided for the terminal serves as the PRS configuration requested on-demand, indicating to the terminal that the PRS configuration in the set of PRS configurations serves as the PRS configuration requested by the terminal on-demand; and in the case that the set of PRS configurations provided for the terminal serves as the PRS configuration preconfigured for the terminal, indicating to the terminal that the PRS configuration in the set of PRS configurations serves as the PRS configuration preconfigured for the terminal.

7. The usage indication method according to claim 1, wherein indicating the usage of the set of PRS configurations to the terminal comprises:

indicating the usage of the set of PRS configurations to the terminal in at least one of an explicit manner or an implicit manner.

8. The usage indication method according to claim 1, comprising at least one of:

wherein the network device comprises a core network, wherein the core network is configured to indicate to the terminal an indication information indicating the usage of the set of PRS configurations, and the indication information is carried in a Long Term Evolution (LTE) Positioning Protocol Message transmitted by the core network to the terminal; or wherein the network device comprises a base station, wherein the base station is configured to indicate to the terminal indication information, wherein the indication information indicates the usage of the set of PRS configurations, and the indication information is carried in a positioning system message broadcast by the base station.

9. A usage determination method, wherein the usage determination method is performed by a terminal and comprises:

receiving a set of positioning reference signal (PRS) configurations transmitted by a network device, wherein the network device can pre-configure positioning assistance information for the terminal, the network device can also configure a PRS configuration requested by the terminal on-demand; and determining a usage of the set of PRS configurations according to an indication of the network device;

wherein determining the usage of the set of PRS configurations according to the indication of the network device comprises one of:

determining, according to the indication of the network device, that a PRS configuration in the set of PRS configurations serves as the PRS configuration requested by the terminal on-demand and the PRS configuration in the set of PRS configurations serves as a PRS configuration preconfigured for the terminal;

determining, according to the indication of the network device, that a PRS configuration in the set of PRS configurations serves as the PRS configuration requested by the terminal on-demand; or determining, according to the indication of the network device, that a PRS configuration in the set of PRS configurations serves as a PRS configuration preconfigured for the terminal.

10. The usage determination method according to claim 9, wherein determining, according to the indication of the network device, that the PRS configuration in the set of PRS configurations serves as the PRS configuration requested by the terminal on-demand comprises:

determining, according to the indication of the network device, that a plurality of PRS configurations in the set of PRS configurations serve as PRS configurations preconfigured for the terminal; or determining, according to the indication of the network device, that the PRS configuration in the set of PRS configurations serves as the PRS configuration requested by the terminal on-demand and the PRS configuration in the set of PRS configurations serves as the PRS configuration preconfigured for the terminal comprises:

determining, according to the indication of the network device, that a plurality of PRS configurations in the set of PRS configurations serve as PRS configurations preconfigured for the terminal and a PRS configuration corresponding to the set of PRS configurations serves as the PRS configuration requested on-demand.

11. The usage determination method according to claim 10, wherein the usage determination method further comprises:

receiving positioning request information transmitted by the network device; and determining, according to indication information carried in the positioning request information, that a first target PRS configuration among the plurality of PRS configurations serves as a PRS configuration.

12. The usage determination method according to claim 9, wherein determining, according to the indication of the network device, that the PRS configuration in the set of PRS configurations serves as the PRS configuration requested by the terminal on-demand and the PRS configuration in the set of PRS configurations serves as the PRS configuration preconfigured for the terminal comprises:

determining, according to the indication of the network device, that one or more PRS configurations in the set of PRS configurations serve as preconfigured PRS configurations and a PRS configuration corresponding to the set of PRS configurations serves as the PRS configuration requested on-demand.

13. The usage determination method according to claim 12, wherein the usage determination method further comprises:

in the case that the preconfigured PRS configurations do not meet requirements, transmitting a PRS configuration request to the network device for requesting for a PRS configuration other than the preconfigured PRS configurations in the set of PRS configurations.

14. The usage determination method according to claim 12, wherein it is determined, according to the indication of the network device, that a plurality of PRS configurations in the set of PRS configurations serve as the preconfigured PRS configurations, and the method further comprises:

determining, according to positioning request information of the network device, that a second target PRS configuration among the plurality of PRS configurations serves as a PRS configuration; and in the case that the second target PRS configuration does not meet requirements, transmitting a PRS configuration request to the network device for requesting for a PRS configuration other than the second target PRS configuration in the set of PRS configurations.

15. The usage determination method according to claim 9, wherein the network device comprises a core network, wherein the core network is configured to indicate to the terminal an indication information indicating the usage of the set of PRS configurations, and the indication information is carried in a Long Term Evolution (LTE) Positioning Protocol Message transmitted by the core network to the terminal.

16. The usage determination method according to claim 9, wherein the network device comprises a base station, wherein the base station is configured to indicate to the terminal an indication information indicating the usage of the set of PRS configurations, and the indication information is carried in a positioning system message broadcast by the base station.

17. A terminal, comprising:

one or more processors; and a memory, storing a computer program;

wherein the computer program, when executed by the one or more processors, causes the terminal to perform the usage determination method according to claim 9.

18. A network device, comprising:

one or more processors; and a memory, storing a computer program;

wherein the network device can pre-configure positioning assistance information for a terminal, the network device can also configure a positioning reference signal (PRS) configuration requested by the terminal on-demand, and the computer program, when executed by the one or more processors, causes the network device to:

transmit a set of PRS configurations to a terminal; and indicate a usage of the set of PRS configurations to the terminal;

wherein the computer program, when executed by the one or more processors, further causes the network device to perform one of:

indicating to the terminal that a PRS configuration in the set of PRS configurations serves as the PRS configuration requested by the terminal on-demand and the PRS configuration in the set of PRS configurations serves as a PRS configuration preconfigured for the terminal;

indicating to the terminal that a PRS configuration in the set of PRS configurations serves as the PRS configuration requested by the terminal on-demand; or indicating to the terminal that a PRS configuration in the set of PRS configurations serves as a PRS configuration preconfigured for the terminal.

* * * * *